(12) United States Patent
Olson

(10) Patent No.: US 6,240,650 B1
(45) Date of Patent: Jun. 5, 2001

(54) WALLPAPER LEVEL EDGE TOOL

(76) Inventor: Cecelia D. Olson, 405 Arbor Ave., Monroe, MI (US) 48162

( * ) Notice: Subject to any disclaimer, the term of this patent is extended or adjusted under 35 U.S.C. 154(b) by 0 days.

(21) Appl. No.: 09/333,238

(22) Filed: Jun. 15, 1999

Related U.S. Application Data

(63) Continuation-in-part of application No. 08/944,164, filed on Oct. 6, 1997, now abandoned.

(51) Int. Cl.[7] .................. B44C 7/06; G01C 9/00
(52) U.S. Cl. .................. 33/354; 33/451; 33/533; 7/105; 7/164
(58) Field of Search .................. 33/354, 377, 379, 33/381, 382, 451, 563, 566, 411, 452, 465, 483, 484, 485, 489, 492, 493, 533, 613, 645; 7/105, 163, 164, 103

(56) References Cited

U.S. PATENT DOCUMENTS

| | | |
|---|---|---|
| 310,046 | 12/1884 | Goodell . |
| D. 352,432 * | 11/1994 | Monroe .................. D8/45 |
| 812,740 * | 2/1906 | Harris et al. .................. 7/105 |
| 2,151,467 * | 3/1939 | Harsin .................. 403/100 |
| 2,677,192 | 5/1954 | Anderson .................. 33/372 |
| 3,302,233 | 2/1967 | Sebastiani .................. 15/235.4 |
| 4,209,865 * | 7/1980 | Kozlowski .................. 7/105 |
| 4,745,688 | 5/1988 | Jewers .................. 33/372 |
| 4,922,621 | 5/1990 | Maier . |
| 4,989,335 * | 2/1991 | Day .................. 33/403 |
| 4,999,921 | 3/1991 | Bird et al. . |
| 5,279,041 | 1/1994 | Wright .................. 33/379 |
| 5,351,357 * | 10/1994 | Liberman .................. 15/245.1 |

FOREIGN PATENT DOCUMENTS

| | | |
|---|---|---|
| 1509831 | 6/1969 | (DE) . |
| 3304-237-A | 8/1984 | (DE) . |

* cited by examiner

*Primary Examiner*—Andrew H. Hirshfeld
*Assistant Examiner*—R. Alexander Smith
(74) *Attorney, Agent, or Firm*—Gifford, Krass, Groh, Sprinkle, Anderson & Citkowski, P.C.

(57) ABSTRACT

A combination leveling and edge trimming tool for use during the application of a wallpaper material to a wall surface. The tool includes a substantially thin and elongate planar shaped body having a first face and a second face as well as a first end and a second end. A bottom face of the body extends between the first and second faces and first and second ends and is suitable for receiving an elongate and substantially rigid blade edge suitable for use in leveling and adhering the wallpaper material to the wall surface. First and second level indicators are incorporated within the body and are operable about respective first and second rotating planes. A non-slip gripping material is secured to a selected first or second face and, upon orienting the tool at a specified angle relative to the wall surface, provides a secure engagement to permit trimming of excess wallpaper material.

8 Claims, 2 Drawing Sheets

WALLPAPER LEVEL EDGE TOOL

CROSS REFERENCE TO RELATED APPLICATIONS

The present application is a continuation-in-part of U.S. Application Ser. No. 08/944,164, filed Oct. 6, 1997 now abandoned, for Wallpaper Level Edge Tool.

BACKGROUND OF THE INVENTION

1. Field of the Invention

The present invention relates generally to level edge tools exhibiting a smooth edged surfaces for use in the application of wallpaper and, more particularly, to a combination wallpaper leveling and trimming tool which incorporates a non-slip surface to enable a user to maintain a grip on the tool even when it become wet with wallpaper paste and water.

2. Description of the Prior Art

Leveling tools are very well known in the art for use in the application, fixing and trimming of wallpaper. Traditionally, a major problem when installing wallpaper is the need for having to constantly switch back and forth between a leveling tool and a straight-edged tool during the application and fixing in place of the wallpaper. This is particularly difficult to accomplish when the user is standing on a ladder or when a handy rest surface for the utensil not being utilized is not readily available.

Also, prior art leveling and straight edge devices tend to exhibit excessive thickness both in the body and straight edged portions to allow for easy, accurate trimming of the wallpaper. It has also been found that wallpaper leveling devices which attach to a vertical side of the wallpaper are both inconvenient and awkward to use.

A further example of the prior art is disclosed in U.S. Pat. No. 4,922,621, issued to Maier, and which discloses an improved guide apparatus for replicating angles, particularly for use in the marking angle lines on building frame members which are waiting to be cut. The guide apparatus of Maier includes a main member with a straight edge, a bubble-type leveling device incorporated into the main member, and an angle arm pivotably attached to the main member by means of a slot in an end of the main member and a bolt with tightening wing nut which extends through the main member. In use, a distal straight edge of the angled arm is held against an angled structure with the wing nut loosened to facilitate angle adjustment. The main member is then raised or lowered until the bubble leveling device indicates that the main member is level. The wing nut is then tightened to establish the angle.

SUMMARY OF THE PRESENT INVENTION

The present invention is a combination leveling and edge trimming tool for use during the application of a wallpaper material to a wall surface and which is an improvement over prior art wallpaper tools and utensils. The tool includes a substantially thin and elongate planar shaped body having a first face and a second face and a first end and a second end. A bottom face of the body extends between the first and second faces and the first and second ends. A first level indication means is provided by a horizontally oriented fluid leveling bubble and is incorporated within the body and operable about a first rotating plane. A second level indication means likewise includes a pair of vertically oriented leveling bubbles likewise incorporated within the body and operable about a second rotating plane.

A non-slip gripping means projects along at least one of the first and second faces of the tool body in proximity to the bottom face and, in the preferred embodiment, includes an elongate strip of heavy duty rubberized material which exhibits and outwardly sloping taper to facilitate secure engagement against the wall surface. An elongate and substantially rigid blade edge is mounted to the body in relation to the bottom face. In a further embodiment, an angling attachment is provided which includes first and second elongate members hingedly secured together. A first of the elongate members includes a slit or pocket defined therein which engages over the rigid blade and so that the second of the members is pivotally actuable about the hinged axis to abut a contiguous angled corner edge of the wall surface and to line up a succeeding sheet of wallpaper. In a further embodiment, an elongate channel is formed in the bottom face of the tool body and facilitates axial inserting of an associated edge of the elongate blade in a fixedly secured manner. The blade edge of the tool is capable of being translated along the wall surface to adhere and level the wallpaper material and the tool may further be gripped by a user in a secure and non-slip manner at a specified angle such that the rubberized gripping strip engages the wall surface and prior to trimming of an unwanted section of the wallpaper material.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION OF THE PREFERRED EMBODIMENTS

Figure 1:
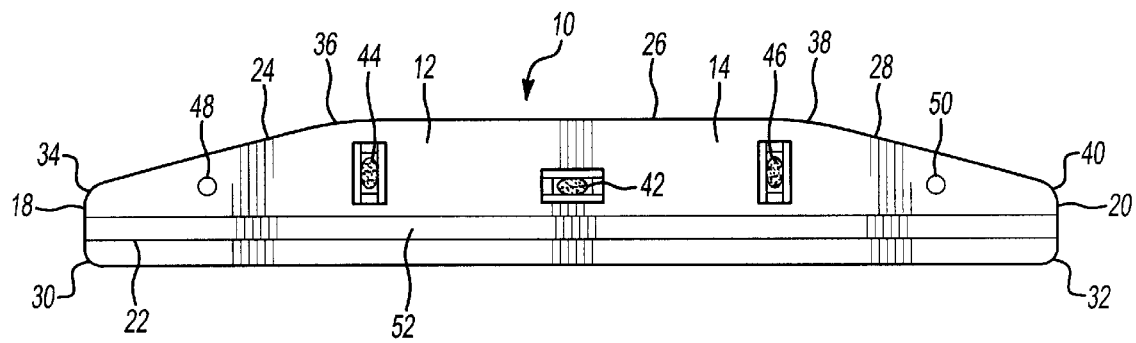
FIG. 1 is front view of the combination leveling and edge trimming tool according to a first preferred embodiment of the present invention.
Figure 2:
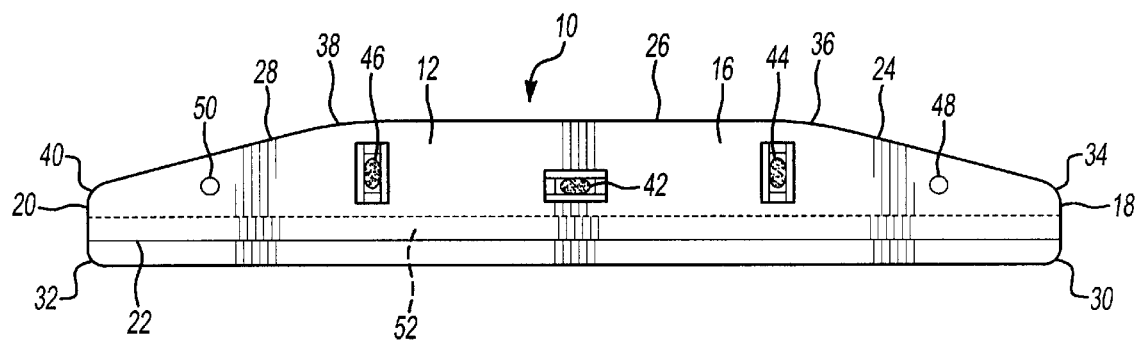
FIG. 2 is a corresponding rear view of the tool shown in FIG. 1.
Figure 3:
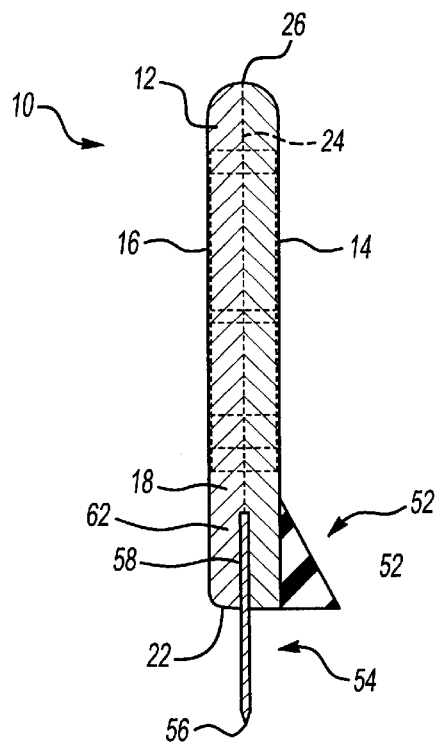
FIG. 3 is a side view of the leveling and edge trimming tool according to the first preferred embodiment.

Referring now to FIGS. 1–3, a combination leveling and edge trimming tool is illustrated at 10 according to the present invention and for use during the application of a wallpaper material to a wall surface. The tool 10 includes a substantially thin and elongate planar shaped body 12 constructed preferably of a durable plasticized material and having a first face 14 and a second face 16, a first end 18 and a second end 20. A bottom face 22 of the body 12 extends between the first and second faces 14 and 16 and the first and second ends 18 and 20. Top edge surfaces are illustrated at 24, 26 and 28 and extending at a top of the elongate tool body 12 between the first end 18 and second end 20 and opposite the bottom face 22. Rounded corners are established between the bottom face 22 and the first and second ends 18 and 20, at 30 and 32, respectively, in addition to other rounded corners, at 34, 36, 38 and 40 which successively extend along the top edge surfaces 24, 26 and 28 and separate the surfaces 24, 26 and 28 from one another between the first and second ends 18 and 20 as clearly shown in front and rear views of FIGS. 1 and 2.

A first level indication means is incorporated within the body 12 and is operable about a first rotating plane to establish a level position and includes a horizontally disposed and leveling bubble cylinder 42. A second level indication means likewise includes a pair of vertically oriented leveling bubble cylinders 44 and 46 likewise incorporated within the body, typically on opposite sides of the horizontal cylinder 42 and operable about a second rotating plane. A pair of apertures 48 and 50 may be formed through the cross sectional width of the elongate body 12 at selected locations and is useful for hanging the tool 10 when not in use.

A non-slip gripping portion projects along a selected one of the first and second faces 14 and 16 and in proximity to the bottom face 22. In the preferred embodiment, the gripping portion is illustrated at 52 and includes an elongate strip of a heavy duty rubberized material which exhibits a substantially outwardly sloped triangular shape in cross section (see particularly in the side view of FIG. 3). The taper of the cross sectionally viewed strip, as will further be explained, may be in directions both towards and/or away from the bottom face 22 for purposes of facilitating the ability of the tool to engage the wall surface (not shown) upon which the wallpaper is applied and wherein the wallpaper is often pre-pasted and rolled in water so that the surface is extremely slippery. As again is best viewed in FIG. 3, the strip 52 is shown with an outward taper in a direction towards the bottom face 22.

An elongate and substantially rigid blade is illustrated at 54 mounted to the body 12 in relation to the bottom face 22. The blade 54 is preferably constructed of a substantially non-yielding stainless steel material and includes a blade edge 56 in addition to a thin cross sectional and planar shaped body 58 and an opposite top edge 60. An elongate channel 62 (see again FIG. 3) may be formed within the bottom face 22 of the tool body 12 and receives in axially inserting fashion the opposite edge 60 of the elongate blade 54 in a fixedly securing manner and so that the knife edge 56 projects downwardly.

The tool 10 as described functions in a first use to permit being translated along the desired wall surface by the user to adhere and level the applied wallpaper material to the wall surface. In a further combination step, the tool 10 is then angled in a secure and non-slip manner against the wallpaper and wall surface by engaging against it the heavy-duty rubberized strip 52 and to permit an excess portion of wallpaper to be trimmed. As was previously described, it is advantageous in the present invention to employ the rubberized or other suitable non-slip material to the combination tool in that other conventional leveling devices often are useless due to the highly slippery nature of pre-pasted wallpaper once it has been soaked in water and applied over the wall surface.

Figure 4:
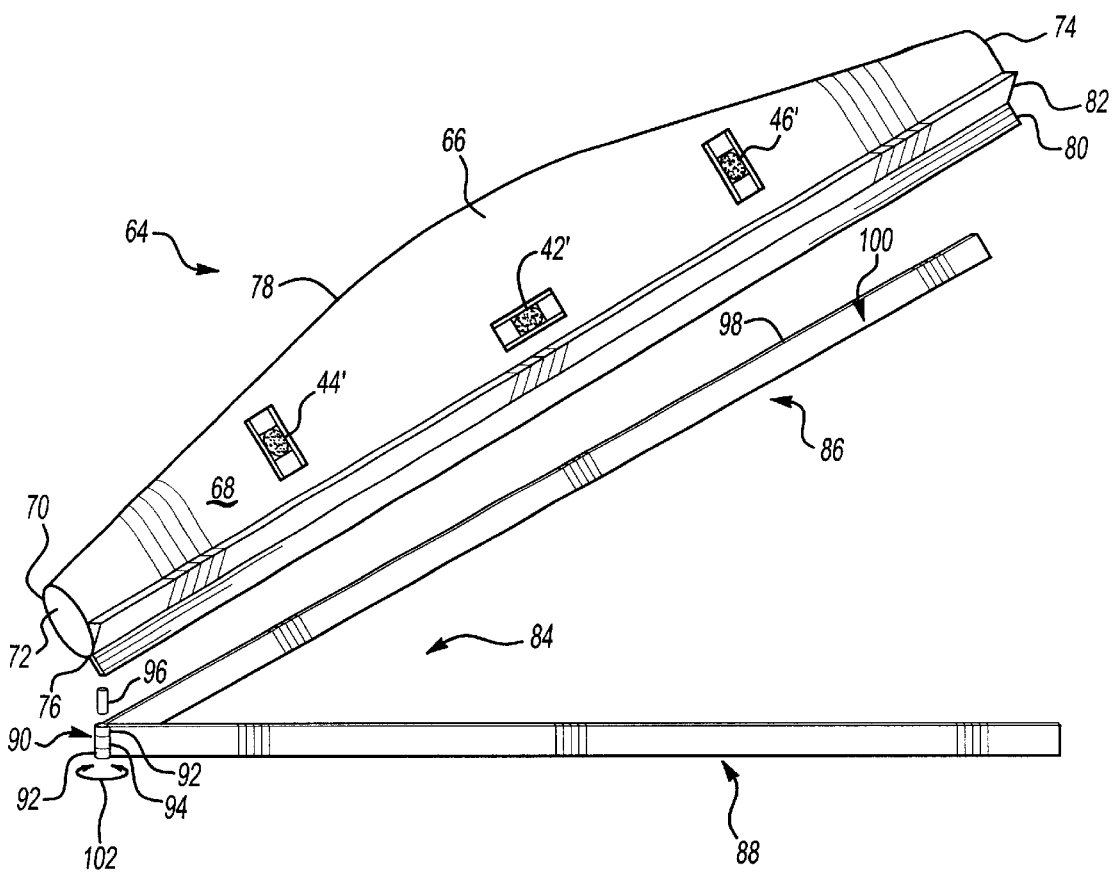
FIG. 4 is a perspective view of a combination leveling and edge trimming tool according to a second preferred embodiment of the present invention.

Referring now to FIG. 4, a perspective view is shown at 64 of a combination leveling and edge trimming tool according to a second preferred embodiment. The tool 64 includes a body 66 which is substantially as shown in the first preferred embodiment such that corresponding elements include the first face 68, second face 70, first end 72 and second end 74. Additional corresponding features include bottom face 76 of the body 66 extending between the first and second faces 68 and 70 and the first and second ends 72 and 74. A single continuous and curved top edge surface is illustrated at 78 and extends along a top of the elongate tool body 66 between the first end 72 and second end 74 and opposite the bottom face 76. First and second level indication means are again provided by a first horizontally disposed and leveling bubble cylinder 42' and a pair of second vertically oriented at leveling bubble cylinders 44' and 46' just as in the first preferred embodiment.

A blade 80 is provided which secures within the bottom face 76 of the tool body 66 much in the same fashion as disclosed in the first preferred embodiment. A non-slip gripping portion 82 is also provided, as in the first preferred embodiment, and is again tapered so as to facilitate the ability of the tool to engage wallpaper set upon a wall surface and upon which is slippery wallpaper paste or water is sandwiched between the wallpaper and the wall surface.

An angling attachment is provided at 84 for use with the combination leveling and edge trimming tool 64 and facilitates the alignment of location for wallpaper to be applied to an angled wall surface contiguous to a corner location. The attachment 84 includes a first elongate member 86 and a second elongate member 88 which is pivotally secured to the first member 86 via a hinge assembly 90. The first and second elongate members 86 and 88 are each further constructed as generally planar shaped members which intersect at a hinge assembly including aligning and alternating sleeve portions 92 and 94 and through which a pin 96 is capable of being inserted.

Defined within a top surface 98 of the first member 86 is a narrow and elongate extending slit or pocket 100. The first member 86 is capable of engaging over the blade 80 and so that the angling attachment 84 is secured to the bottom of the tool 64. Upon securement of the angling attachment 84 and aligning of the first end 72 at a corner location (not shown) of the wall surface, the second member 88 is rotated outwardly, in a direction shown by rotational axis 102 in FIG. 4, and so that an accurate alignment is accomplished for a succeeding sheet of wallpaper to be applied to an angled and contiguous wall surface. Upon completion of this task, the angling attachment 84 may be detached from the tool 64 and permitting the tool to resume its use as a leveling/trimming device for the wallpaper to be applied to the succeeding angled wall surface.

It is evident therefore that the present invention discloses a novel and improved combination leveling and edge trimming tool for use in applying and trimming wallpaper. Having described my invention, further embodiments will become apparent to those skilled in the art to which it pertains without deviating from the scope of the appended claims.

I claim:

1. A combination leveling and edge trimming tool for use during the application of a wallpaper material to a wall surface, said tool comprising:

a substantially thin and elongate planar shaped body having a first face and a second face, a first end and a second end, a bottom face of said body extending between said first and second faces and said first and second ends;

a first level indication means incorporated within said body and operable about a first rotating plane and a second level indication means incorporated within said body and operable about a second rotating plane;

non-slip wall gripping means projecting along at least one of said first and second faces and in proximity to said bottom face;

an elongate and substantially rigid blade mounted to said body in relation to said bottom face and including a downwardly facing blade edge;

wherein said blade edge of said tool is capable of being translated along the wall surface to adhere and level the wallpaper material thereto; and wherein said tool may be gripped by a user in a secure and non-slip manner at a specified angle such that said gripping means engages the wall surface prior to trimming of an unwanted section of the wallpaper material.

2. The combination leveling and edge trimming tool according to claim 1, further comprising an angling attachment securable to said tool body and facilitating an alignment of a further sheet of wallpaper to a further and contiguous angled wall surface.

3. The combination leveling and edge trimming tool according to claim 2, said angling attachment further comprising a first elongate member and a second elongate member which is pivotally secured to said first elongate member by a hinged connection, a elongate pocket being defined within a top surface of said first member and capable of engaging over said blade so that said second member is pivotally actuable therefrom.

4. The combination leveling and edge trimming tool according to claim 1, said body being constructed of a durable plasticized material.

5. The combination leveling and edge trimming tool according to claim 1, said elongate and substantially rigid blade being constructed of a stainless steel material.

6. The combination leveling and edge trimming tool according to claim 1, further comprising an elongate channel formed within said bottom face of said body and receiving an axial inserting edge of said elongate blade in a fixedly securing manner.

7. The combination leveling and edge trimming tool according to claim 1, said non-slip gripping means further comprising an elongate strip of heavy duty rubberized material and which exhibits a substantially outwardly sloped triangular shape in cross section and in a direction either towards or away from said bottom face.

8. The combination leveling and edge trimming tool according to claim 1, further comprising sloping corners between said bottom face and said first and second ends, as well as between said first and second ends and top edge surfaces of said body.

* * * * *